(No Model.) 3 Sheets—Sheet 1.

M. A. HARRIS.
BICYCLE.

No. 584,685. Patented June 15, 1897.

Witnesses
Raphael Netter
J. Ell Bowen

Inventor
Moses A. Harris.

(No Model.) 3 Sheets—Sheet 2.

M. A. HARRIS.
BICYCLE.

No. 584,685. Patented June 15, 1897.

Witnesses
Raphaël Netter
J. E. M. Bowen

Inventor
Moses A. Harris.

(No Model.)  M. A. HARRIS.  3 Sheets—Sheet 3.
BICYCLE.
No. 584,685.  Patented June 15, 1897.
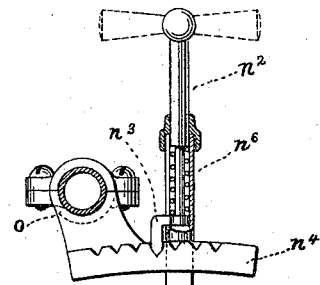
Fig. 8.
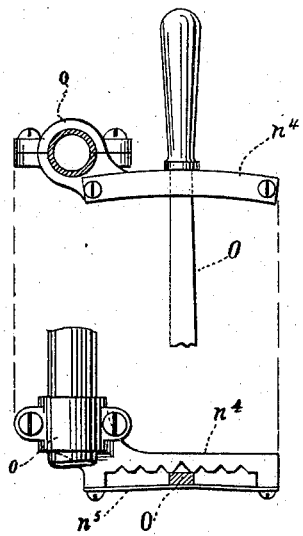
Fig. 7.
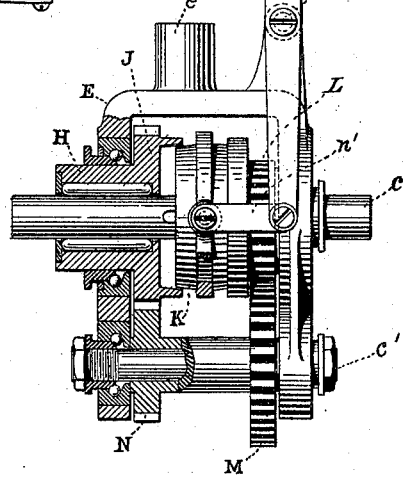
Witnesses  
Raphael Netter  
Inventor  
Moses A. Harris.

UNITED STATES PATENT OFFICE.

MOSES A. HARRIS, OF NEW YORK, N. Y.

BICYCLE.

SPECIFICATION forming part of Letters Patent No. 584,685, dated June 15, 1897.

Application filed September 2, 1893. Serial No. 484,620. (No model.)

*To all whom it may concern:*

Be it known that I, MOSES A. HARRIS, a citizen of the United States, and a resident of New York, in the county of New York and State of New York, have invented certain new and useful Improvements in Bicycles, of which the following is a specification.

My invention relates to bicycles, and is applicable to any of the bicycles now on the market. It is also adapted to be applied to tricycles. As commonly constructed, the speed of a bicycle depends upon the relative sizes of the sprocket-wheels on the driven and driving shafts. The maximum speed of my bicycle is determined by the size of the sprocket-wheel fixed to the sleeve, which is loose on the driving-shaft and is not at all dependent upon the mechanism constituting my present invention.

The object of my invention is to combine with the pedal or driving shaft a system of gearing operated by a clutch at the pleasure of the rider without dismounting from the machine or stopping the same, whereby the propelling power may be increased without the exertion of any extra effort on the part of the rider. The rider is thus enabled to overcome obstacles in the roadway and ride up elevations without exhausting himself.

It is the intention to apply my improvements to the construction of new bicycles and tricycles, and also to apply the same as an attachment to existing machines.

My invention is illustrated in the accompanying drawings, which form a part of this specification, and the particular features and combinations for which protection is desired are specified in the claim at the end of this description.

Figure 1:
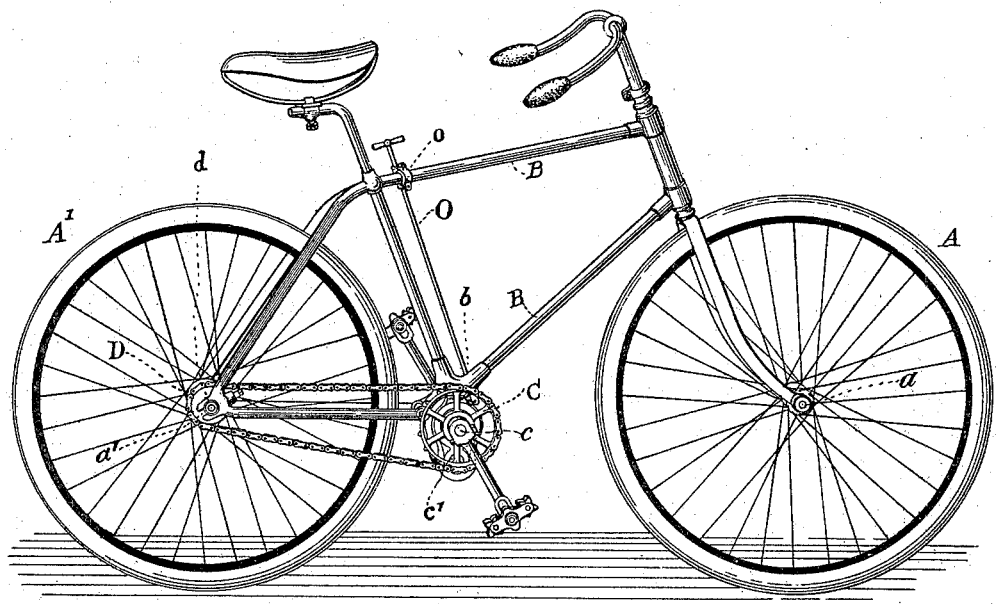
Figure 3:
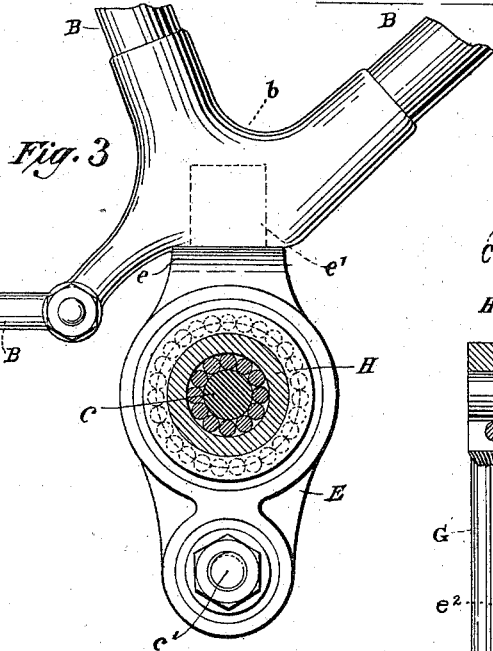
Figure 2:
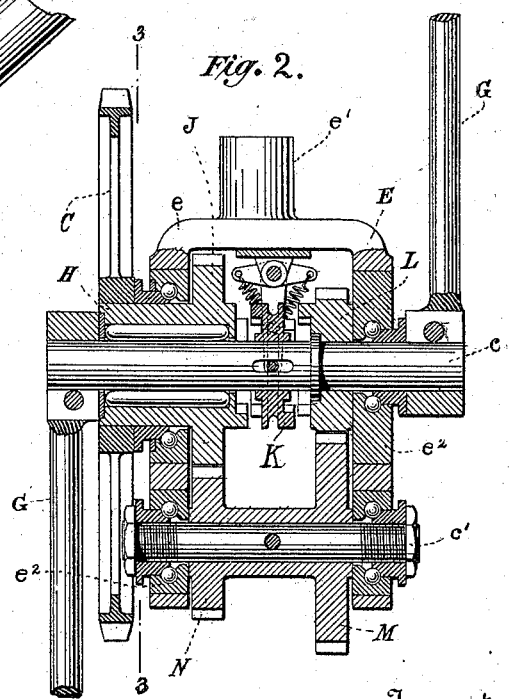
Figure 5:
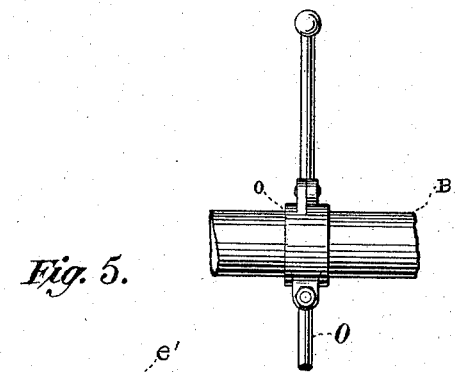
Figure 4:
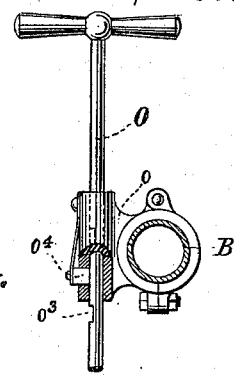
Figure 6:
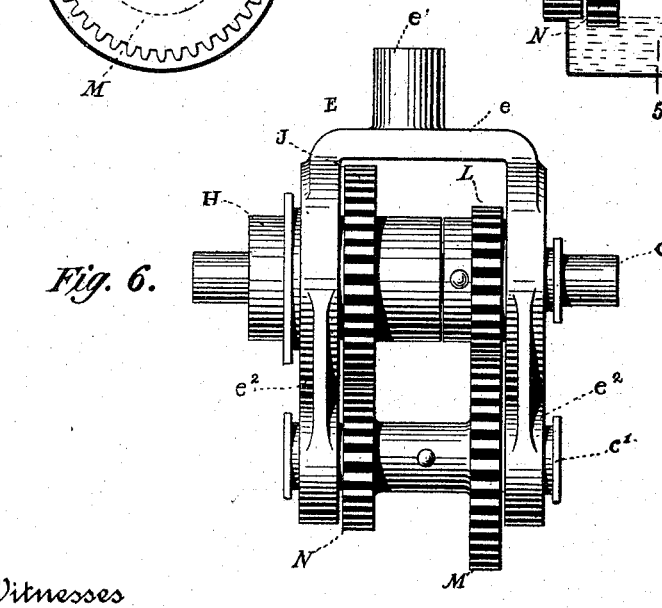

In the drawings, wherein like parts are indicated by like letters of reference in the several views, Figure 1 is a perspective view of a bicycle embodying my invention. Fig. 2 is a vertical section through the gearing mechanism. Fig. 3 is a section on the line 3 3 of Fig. 2. Fig. 4 is a front elevation of the gearing mechanism, showing also the clutch-shifting device partly in section. Fig. 5 is a section through the line 5 5 of Fig. 4. Fig. 6 is a view in elevation, showing a permanent gearing mechanism, the shifting-clutch being omitted. Fig. 7 is a view in elevation, partly in section, showing an embodiment of my invention in which there is embraced a friction-clutch in lieu of the spring-operated clutch of the construction shown in the other views, the said view also showing, partly in section, the locking mechanism of the operating-rod of the clutch; and Fig. 8 is a modification of the upper part of the operating-rod mechanism shown in Fig. 7.

Referring to the drawings, A A' indicate the front and rear wheels, respectively, of a bicycle of a well-known construction, and $a\ a'$ the axles of said wheels, which are suitably journaled in the frame of the bicycle. This frame is indicated by B and furnishes a support for the seat of the rider and for the steering-post and its handle and the driving-shaft and cranks. The speed of the machine is regulated by the relative sizes of the sprocket-wheels C D, mounted respectively on the driving-shaft $c$ and the hub $d$ of the rear wheel A', the maximum speed being attained when the clutch of the gearing mechanism is connected with the sleeve, upon which is mounted the sprocket-wheel C, and the speed is decreased, with an increase of power of propulsion, when said clutch is thrown in the opposite direction and connected with the gear-wheel, with which it is adapted to coöperate, as hereinafter more fully explained. When the clutch is in its central position, the pedals will not operate the machine at all, and in this position of the clutch the pedals may be used as rests for the feet of the rider when going down hill.

My improvements are connected to the base of the frame B and replace the usual driving-shaft carrying the pedals and cranks. In the construction of new machines the coupling-piece $b$, which joins the lower members of the frame B together, is so made as to be adapted to support the frame of my gear mechanism, or the coupling means for the said members of the frame B may constitute a part of the said frame of the gearing mechanism. These details may, however, be varied without affecting the character of my invention.

When the improvements are applied to old bicycles, a socket may be provided in the coupling $b$ for receiving and holding a projection of the frame of the gearing mechanism, as shown, for example, in Fig. 3, the said projection being indicated by dotted lines and seen as entering the coupling at its bottom.

One embodiment of my invention is shown in Fig. 2, the parts being in section to better illustrate the construction. The frame of the gearing mechanism is designated by E, and consists of the top portion $e$, provided with the projection $e'$, which is adapted to enter the socket of the coupling $b$, and the sides $e^2$, in which are provided the bearings for the driving or crank shaft $c$ and the shaft $c'$ of the supplemental gearing. The shaft $c$ has connected to its end outside of the frame E the cranks G. The driving sprocket-wheel C is keyed to a sleeve H, which is adapted to revolve loosely on the driving-shaft $c$, roller-bearings being arranged between the inner surface of the sleeve and said shaft and on bearings between the outer surface of the sleeve and the framework, as seen in Fig. 2. On the inner end of sleeve H there is fixed or formed integrally a gear-wheel J, the side of whose surface is provided with teeth adapted to interlock with teeth on the clutch K. The said clutch K is keyed to the driving-shaft $c$, so that it will revolve therewith and yet have a movement longitudinally thereon, the slot in the shaft and connecting-pin, as shown in Fig. 2, permitting of said movement and thus providing for the shifting of the clutch to fix the sleeve H to revolve with shaft $c$, or fix the gear-wheel L to revolve with said shaft, the said gear-wheel having on its inner face teeth which coact with the teeth of the clutch, as shown.

The gear-wheel L is normally loose on the shaft $c$ and runs loose therewith except when the clutch K is connected to it, said gear-wheel L intermeshing with the gear-wheel M, keyed to the supplemental shaft $c'$. On the shaft $c'$ there is also fixed a gear-wheel N, which in this instance is formed integral with a sleeve or extension of gear-wheel M. These wheels may be made separately and independently keyed to the shaft $c'$, if desired. The journals of shafts $c'$ are provided with ball-bearings the same as the journals of the driving-shaft $c$, as seen in Fig. 2. The gear-wheel N intermeshes with the gear J, formed with or connected to the sleeve H.

The frame E of the gearing mechanism is inclosed, and at the bottom thereof there may be provided a receptacle for lubricant, as shown in Fig. 5, whereby the gear-wheels may be automatically lubricated.

The clutch K is operated by the rider from his seat by means of the rod O, the handle of which is immediately beneath the seat, the rod being stayed to the frame B by the bracket $o$. The lower end of the operating-rod O is pivoted to the shifting lever $o'$, which is suitably connected to the lever $o^2$, operating within the central groove of the clutch K. The operating-rod O in Fig. 4 is provided with a notch $o^3$, adapted to coöperate with spring-stop $o^4$, as shown in Fig. 4, whereby the position of the clutch may be fixed when the same has been adjusted as desired. Coiled springs P connect the shifting levers $o'$ $o^2$ and serve to assist in retracting the levers when shifting the position of the clutch.

In Fig. 6 the parts are the same as those shown in Fig. 2, excepting that there is no clutch employed, the gear-wheel L being permanently keyed upon the shaft $c$, so that as the said shaft revolves the wheel L will communicate the motion of the shaft $c$ to the wheel M, and likewise the motion of the supplemental shaft $c'$ will be communicated to gear-wheel N, intermeshing with gear-wheel J, fixed upon the sleeve H, and thus motion is communicated to the driving sprocket-wheel C, keyed to the sleeve H. This embodiment of the gearing mechanism is intended more particularly for tricycles, where great speed is not desired, but increased power in the driving mechanism is of importance.

In Fig. 7 there is illustrated an embodiment of my gearing mechanism which in all essential respects is the same as that shown in Fig. 2, with the exception that a friction-clutch is made use of instead of the clutch in Fig. 2, which, as explained, is provided with teeth that positively interlock with corresponding teeth on the coöperating gear-wheel and sleeve. In this view, Fig. 7, the gearing is the same as already explained in describing Fig. 2. The gear-wheel J in this view is provided on its inner surface with a depression adapted to coöperate frictionally with the clutch K, and there is like provision on the inner surface of the gear-wheel L. The means for operating the clutch K of Fig. 7 consists of the rod O, which is pivoted at $n$ to a projection of the frame E, said rod being bifurcated below said pivoted point and the bifurcated ends connected to the shifting levers $n'$, whose inner ends coöperate with the central groove of the clutch. The upper end of the operating-rod O, Fig. 7, is hollow, and receives the handle $n^2$, provided at its lower end with an enlargement serving as a piston, and having a downwardly-projecting extension $n^3$, which is adapted to move vertically within a slot of the hollow upper end of the rod O and coöperates with notches formed in the segmental piece $n^4$, connected to the bracket $o$, which is secured to the frame B. Within the hollow upper end of the rod O is a spring $n^6$, located between the enlargement on the lower end of the handle $n^2$ and a shoulder formed by the reduced portion of the handle which enters the rod. This spring serves to maintain the projection $n^3$ within the notch in segment $n^4$ in which it is placed, and thus secures the clutch in the position to which it may be shifted.

In Fig. 8 there is shown a modification of the means for fixing the rod O in the position to which it may be shifted, which consists in a flat spring $n^5$ of the requisite flexibility secured to the projecting piece $n^4$, which piece in this instance is provided with teeth on a plane with the movement of which the rod O partakes when shifting the same, and which teeth are adapted to coact with the rod O, all as shown in Fig. 8. This form of securing the operating-rod O in place is the one preferred by me.

In the operation of my invention it will be observed that as the sleeve H, upon which is mounted the sprocket-wheel C, and gear-wheel L are loose upon the driving-shaft $c$ no motion is communicated to the driving sprocket-wheel C when the clutch K is out of action or in its central position. When the clutch K is shifted to coact with the sleeve H, the effect is to fix the said sleeve and likewise the gear-wheel J, which is formed integral therewith, to the shaft, so that the motion of the shaft induced by the operation of the cranks is transferred directly to the driving sprocket-wheel C. When the clutch is shifted to coöperate with the gear-wheel L, the said gear-wheel is fixed to the driving-shaft $c$ and, intermeshing with gear-wheel M, communicates the motion of the said driving-shaft $c$ to the supplemental shaft $c'$, and through the gear-wheel N to the gear J of the sleeve H, which carries the driving sprocket-wheel C. In the latter position of the clutch the speed, by reason of this type of gearing, is decreased from that obtained when the clutch is in coöperation with sleeve H, but the power is augmented, as is obvious. The character of gearing which is employed in the example of my invention illustrated in the drawings is such that the power is increased twofold when the clutch is connected to gear-wheel L; but I do not wish to limit myself to the gearing illustrated, as the relative proportions of the several wheels may be varied without departing from the spirit of my invention, the main purpose of which being to so combine with a bicycle a gearing mechanism which may be adjusted in one position and secure the highest efficiency of the speed of the machine, when speed and not power is desired, as when traveling on a level surface, and adjusted in another position to secure increased power of propulsion without the exertion of extra effort on the part of the rider which is desirable when mounting an elevation or overcoming obstructions in the roadway.

Having thus described my invention, what I claim as new, and desire to secure by Letters Patent, is—

In a bicycle, the combination with the integral connecting-piece $b$ at or near the point for the pedal-shaft, provided with suitable connections for the various rods of the frame, and having a socket in its under side; of the frame E composed of the two similar arms $e^2$ $e^2$ provided with larger and smaller openings for the reception of the bearings for the main and supplemental driving-shafts, respectively, and joined by cross-piece $e$ at their upper ends having a tenon or projection $e'$ formed integral therewith and rigidly seated in the said socket in the connecting-piece $b$; a main driving-shaft having pedal-cranks mounted thereon loosely journaled in said larger openings; independent gears mounted loosely upon said shaft, and one of said gears having a sprocket-wheel fixed thereto to rotate therewith; a double-faced clutch keyed on said shaft between said gears; a rock-shaft mounted in the upper part of said frame E; a pair of forked arms mounted loosely upon said rock-shaft and engaging in a peripheral groove in said clutch; a pair of double laterally-extending arms rigidly mounted upon said rock-shaft; coil-springs connecting the ends of each double arm with said forked arms; a rocking lever rigidly mounted upon said rock-shaft; a rod pivoted to one end of said rocking lever and passing through a holding-guide secured to a rod of the bicycle-frame; a handle on said rod, and means for locking said rod; and a pair of toothed gears of different sizes rigidly mounted upon a supplemental shaft loosely journaled in said smaller opening in the frame E, and meshing with the gears on the main shaft, substantially as described.

Signed at New York, in the county of New York and State of New York, this 16th day of August, A. D. 1893.

MOSES A. HARRIS.

Witnesses:
 J. E. M. BOWEN,
 FRANK G. WILD.